United States Patent
Daigle

(10) Patent No.: US 7,613,136 B2
(45) Date of Patent: Nov. 3, 2009

(54) METHODS, SYSTEMS, AND COMPUTER PROGRAM PRODUCTS FOR IMPLEMENTING COMMUNICATIONS RE-CONNECTION SERVICES

(75) Inventor: Brian Daigle, Marietta, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 549 days.

(21) Appl. No.: 11/314,695

(22) Filed: Dec. 20, 2005

(65) Prior Publication Data

US 2007/0140253 A1     Jun. 21, 2007

(51) Int. Cl.
*H04L 12/28* (2006.01)
(52) U.S. Cl. .................. 370/259; 370/395.2
(58) Field of Classification Search ............. 370/395.2, 370/395.4, 453, 454; 379/202.01, 207.06, 379/207.07
See application file for complete search history.

(56) References Cited

U.S. PATENT DOCUMENTS

2004/0141605 A1* 7/2004 Chen et al. ............. 379/202.01
2006/0177034 A1* 8/2006 Reding et al. ........... 379/211.02

* cited by examiner

*Primary Examiner*—Chirag G Shah
*Assistant Examiner*—Minh-Trang Nguyen
(74) *Attorney, Agent, or Firm*—Cantor Colburn LLP

(57) ABSTRACT

A method, system, and computer program product for implementing communications re-connection services is provided. The method includes determining whether a disconnection for a communications session occurring between at least two devices is voluntary. The method also includes automatically attempting to re-establish the communications session between the at least two devices if results of the determining indicate that the disconnection was involuntary. An involuntary disconnection results from at least one of: a signal interruption; a device malfunction; and an out of area signal.

14 Claims, 2 Drawing Sheets

METHODS, SYSTEMS, AND COMPUTER PROGRAM PRODUCTS FOR IMPLEMENTING COMMUNICATIONS RE-CONNECTION SERVICES

BACKGROUND

The present invention relates generally to communications services, and more particularly, to methods, systems, and computer program products for implementing communications re-connection services.

The recent advancements made in the field of communications technologies have caused an explosion in the proliferation of new and improved communications devices for exploiting these technologies. Technology users are faced with a wide variety of choices in implementing communications, such as computer-based communications and associated devices, as well as various types of wireless communications and associated devices.

Communications service providers are seeking new and unique services for these technology users in order to stay competitive in this growing marketplace. For example, services such as caller identification, voicemail, call forwarding, and multi-party conferencing services are now available. However, one type of service that is lacking involves the capability to automatically re-connect with an unintentionally- or involuntarily-lost communication, e.g., one that is caused by a signal interruption.

What is needed, therefore, is a way to determine when a communication session has been terminated due to voluntary or involuntary actions, and if involuntary, attempt automatic re-connection of the devices for which the session was terminated.

BRIEF SUMMARY

Exemplary embodiments include a method for implementing communications re-connection services. The method includes determining whether a disconnection for a communications session occurring between at least two devices is voluntary. The method also includes automatically attempting to re-establish the communications session between the at least two devices if results of the determining indicate that the disconnection was involuntary. An involuntary disconnection results from at least one of: a signal interruption; a device malfunction; and an out of area signal.

Additional exemplary embodiments include a system for implementing communications re-connection services. The system includes a host system executing a communications re-connection application. The communications re-connection session application performs a method. The method includes determining whether a disconnection for a communications session occurring between at least two devices is voluntary. The method also includes automatically attempting to re-establish the communications session between the at least two devices if results of the determining indicate that the disconnection was involuntary. An involuntary disconnection results from at least one of: a signal interruption; a device malfunction; and an out of area signal.

Further exemplary embodiments include a computer program product for implementing communications session transfer services. The computer program product includes instructions for implementing a method. The method includes determining whether a disconnection for a communications session occurring between at least two devices is voluntary. The method also includes automatically attempting to re-establish the communications session between the at least two devices if results of the determining indicate that the disconnection was involuntary. An involuntary disconnection results from at least one of: a signal interruption; a device malfunction; and an out of area signal.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, a method, system, and computer program product for implementing communications re-connection services are provided. The communications re-connection services provide an automated system that monitors active communications sessions, and if an interruption of a session is detected, determine whether the interruption was voluntary or involuntary. A voluntary interruption or termination may include, e.g., an act of hanging up a telephone, which terminates the session by interrupting the transmission of a communications signal to the device. An involuntary interruption includes one in which a signal transmitted between the session devices has been interrupted (e.g., a power outage or fluctuation, a device that travels out of a calling area, a device malfunction, or other similar types of actions). If the disconnection is determined to be involuntary, the communications re-connection services may attempt to automatically re-establish a connection between the devices.

Figure 1:
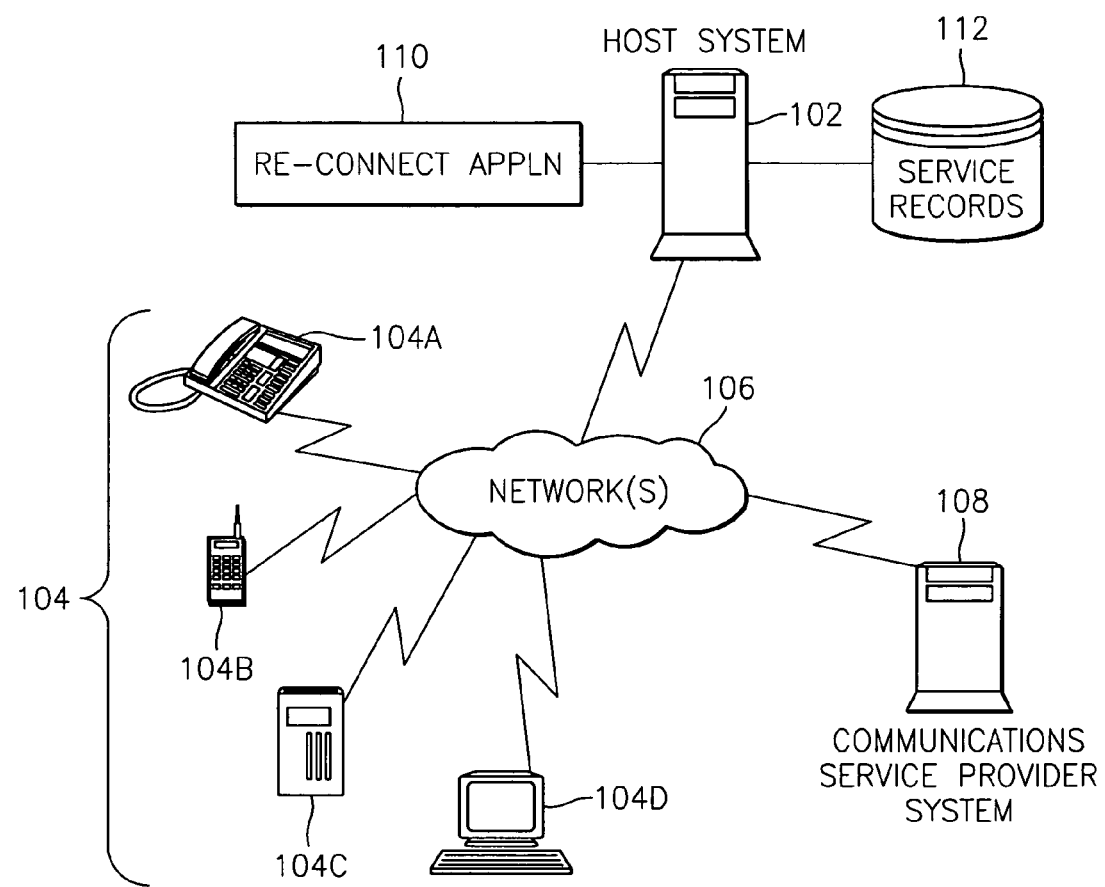
FIG. 1 depicts a system upon which the communications re-connection services may be implemented in exemplary embodiments.

Turning now to FIG. 1, a system upon which the communications re-connection services may be implemented in accordance with exemplary embodiments will now be described. The system of FIG. 1 includes a host system 102 in communication with communications devices 104 and a communications service provider system 108 over one or more networks 106. In exemplary embodiments, the host system 102 refers to an entity that provides the communications re-connection services described herein.

Communications devices 104 may be implemented using a variety of different communications technologies. For example, communications device 104A may be implemented via a wireline telephone that communicates over a circuit-switched network (e.g., standard public switched telephone network (PSTN), such as one of networks 106). Alternatively, communications devices 104A may be implemented via a standard wireline telephone utilizing Internet telephony technology, such as an Internet telephony service provider service along with a unique code that is entered into the device 104A prior to entering the telephone number to be called. With the advent of gateway servers and Voice over the Internet (VoIP) protocols, communications device 104A may initiate a telephone call that is processed and transmitted over a combination of networks, e.g., circuit-switched and packet-switched networks.

Communications device 104B may be implemented via a wireless mobile telephone or cellular telephone. Communications device 104C may represent a personal digital assistant (PDA) or similar wireless mobile computer-processing device. Under a subscription agreement with a wireless service provider, communications devices 104B and 104C may communicate over one or more networks (e.g., satellite, radio, cellular) represented by the networks 106 of FIG. 1.

Communications device 104D represents a wireless or wireline computer device such as a personal computer or laptop. With the proper tools (e.g., an Internet service subscription and modem, voice communications software, a microphone, sound card, and receiver), communications device 104D may also implement voice communications over a packet-switched network. The computer may be a personal computer (e.g., desktop, laptop) that communicates over a network using an Internet service provider (ISP). Communications device 104D may also communicate over the Internet utilizing, e.g., digital subscriber line (DSL), cable, dial-up, wireless communications protocols (Bluetooth, WAP, etc.), and/or other known networking technologies.

Network(s) 106 may include distributed networks such as a local area network, wide area network, metropolitan area network, etc. For example networks 106 may include a corporate LAN representing an enterprise local area network that services one or more of communications devices 104, which in turn communicate with one another in a closed network environment such as an Intranet. Likewise, the corporate LAN may communicate with external entities (e.g., those communications devices 104 that are not part of the LAN) utilizing, e.g., DS1, T1 leased lines, a Virtual Private Network, or similar communications networking means. The networks 106 may further be implemented using wireless networks or any kind of physical network implementation known in the art.

Each of communications devices 104 (and the network 106, e.g., a corporate LAN) may receive communications services from one or more service providers. Service providers provide telephone, Internet, and messaging services via multiple network configurations including, e.g., standard PSTN or circuit-switched networks and packet-switched networks that utilize, e.g., Internet Protocol (IP), asynchronous transfer mode (ATM), and frame relay protocols for transmitting digital data. In exemplary embodiments, these service providers are implemented by host system 102 and communications service provider system 108.

Services providers, such as host system 102 and communications service provider system 108 may include telephony service providers such as local exchange and interexchange carriers including incumbent and/or competitive exchange carriers. Alternatively, one of the service providers may be a telephony service provider while the other is an Internet service provider, wireless telephone service provider, or other similar type of communications service provider enterprise. By communicating with various types of service provider entities, disparate types of communications and networks can be seamlessly integrated. For example, a voice call initiated from a standard wireline telephone (e.g., device 104A) may be processed by a telephone service provider (e.g., host system 102), transmitted to a softswitch where it is converted into digital format, transmitted over an IP network to a second telephone service provider (e.g., service provider system 108) where it is converted to analog format and terminated at a receiving communications device.

Network infrastructures for handling communications services are commonly understood by those skilled in the art and, therefore, for ease of explanation and simplicity, the detailed network elements utilized in implementing these infrastructures are not provided in the system of FIG. 1.

As indicated above, host system 102 facilitates the communications re-connection services described herein. Each of the host system 102 and communications service provider system 108 depicted in FIG. 1 may be implemented using one or more servers operating in response to a computer program stored in a storage medium accessible by the servers. The host system 102 and communications service provider system 108 may each operate as a network server (e.g., a web server) to communicate with one or more of communications device 104.

Each of the host system 102 and communications service provider system 108 may also operate as an application server. For example, the host system 102 and communications service provider system 108 may execute one or more computer programs to provide communications services to subscribing devices (e.g., communications devices 104). In addition, the host system 102 executes a re-connection application 110 for implementing the communications re-connection services provided herein. In alternative exemplary embodiments, processing of the communications re-connection services may be shared by other network entities (e.g., communications devices 104 and/or communications service provider system 108) and the host system 102 by providing an application (e.g., java applet) to these systems. Alternatively, these systems can include stand-alone software applications for performing a portion of the processing described herein. As previously described, it is understood that separate servers may be utilized to implement the network server functions and the application server functions.

Figure 2:
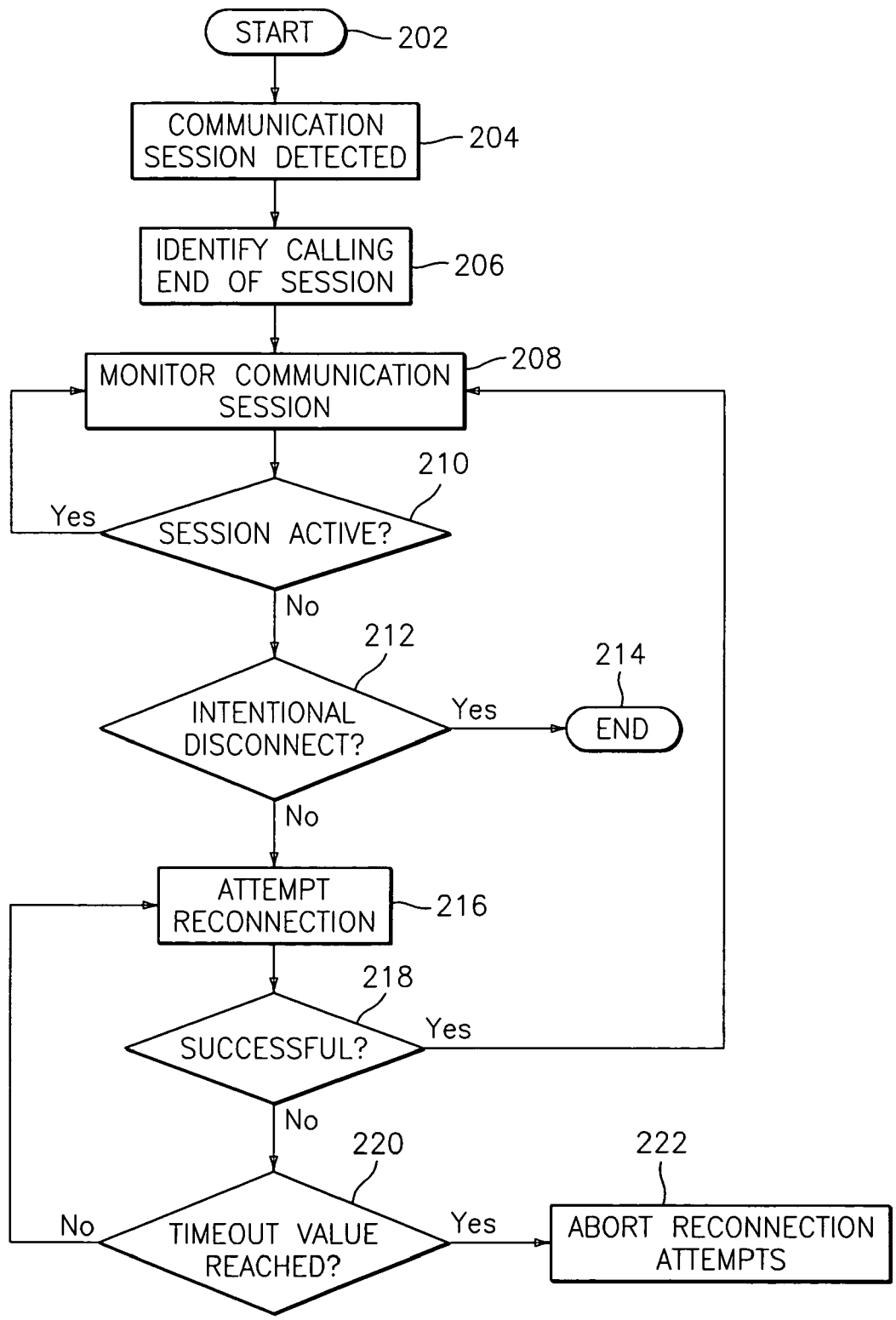
FIG. 2 is a flow diagram describing a process for implementing the communications re-connection services in exemplary embodiments.

The functionality of the communications re-connection application 110 is described further in FIG. 2.

In exemplary embodiments, host system 102 is in communication with a storage device 112. The storage device 112 may be implemented using a variety of devices for storing electronic information. It is understood that the storage device 112 may be implemented using memory contained in the host system 102 or it may be a separate physical device. The storage device 112 is logically addressable as a consolidated data source across a distributed environment that includes networks 106. Information stored in the storage device 112 may be retrieved and manipulated via the host system 102. The storage device 112 houses one or more databases of service records for managing customer accounts for users of communications devices 104. Service records may be generated via the re-connection application 110. Other data may be stored in storage device 112 including, for example, an automatic number identification (ANI) directory and corresponding functionality for performing call number translations. In an exemplary embodiment, the host system 102 operates as a database server and coordinates access to application data including data stored on storage device 112.

As indicated above, the communications re-connection services provide an automated system that monitors active communications sessions, and if an interruption of a session is detected, determine whether the interruption was voluntary or involuntary. If the disconnection is determined to be involuntary, the communications re-connection services may attempt to automatically re-establish a connection between the devices.

Turning now to FIG. 2, a process for implementing the communications re-connection services will now be described in exemplary embodiments. For ease of explanation, a communications device 104 that initiates the communications session is referred to herein as a calling device and the communications device 104 on the other end of the session is referred to as a called device.

The process begins at step 202, whereby a communications session between two devices is detected at step 204. This detection may occur via, e.g., the establishment of the communication session that is facilitated by the entity providing the communications services (e.g., host system 102). The communications re-connection application 110 identifies the calling device at step 206. The utility of this identification is described further herein.

At step 208, the communications re-connection application 110 monitors the communication session in order to confirm the continued presence of the communications signal of the session, for example, by monitoring the impedance of a circuit-switched communications device (on-hook, off-hook detection) from the communications switch, or by monitoring whether packets are still being received in a packet-switched network. As a result of the monitoring, the communications re-connection application 110 determines if the session is still active at step 210. If so, process returns to step 208 whereby the session continues to be monitored.

In step 212, a determination is made as to whether a session has been terminated voluntarily. For example, a determination can be made as to whether an intentional or voluntary disconnection occurred based on, e.g., whether an on-hook signal has been detected, whether a session termination packet over a wireless or packet-based network has been received, etc. Once the cause has been determined, it is then determined whether the disconnect was voluntary (e.g., a hang up) or involuntary (e.g., a signal interruption).

If the disconnect was intentional, or voluntary, at step 212, the process ends at step 214. This is because the calling party and/or the called party intended to end the communications session.

If, however, the disconnect was involuntary at step 212, the communications re-connection application 110 attempts to re-establish a connection between the parties at step 216. This may be an automated process that is initiated without any action taken on the parties or may be implemented upon consent of one or both of the parties. For example, the communications re-connection application 110 may first query the calling party whether he/she would like to re-establish a connection prior to performing step 216. Upon receiving a 'yes' response from the calling party, the attempt to re-connect may be initiated. Thus, for this purpose, it is desirable that the communications re-connection application 110 determines which of the parties to the session is the calling party. In exemplary embodiments, the communications re-connection application 110 attempts to re-establish the connection without requiring any user input. It may do this, for example, by detecting any disconnected device's presence on the network, which may be based on the receipt of packets from that device. Once this presence is detected, it re-establishes the existing communication session to the disconnected device.

At step 218, it is determined whether the re-connection is successful; that is, whether a communications session has been successfully re-established between the parties. If so, the process returns to step 208, whereby the communications re-connection application 110 continues to monitor the newly established communications session between the parties.

If, however, the attempt was not successful at step 218 (e.g., one or both of the parties cannot be reached because of, e.g., a busy signal, no signal, etc.), it is then determined whether a time-out value has been reached at step 220. In exemplary embodiments, a time-out value may be used to specify a maximum number of re-connection attempts that will be made before aborting the re-connection, or a maximum time period that elapses before aborting the re-connection, or a combination thereof. This time-out value may be set by the communications re-connection application 110 or may alternatively be set by the calling party under a service agreement with the service provider of host system 102.

If the time-out value has been reached at step 220, the communications re-connection application 110 aborts the re-connection attempts at step 222. Otherwise, the process returns to step 216 and the communications re-connection application 110 continues to attempt the re-connection.

As indicated above, the communications re-connection services may be extended for use by competing service provider enterprises (e.g., communications service provider system 108) under a service agreement, in order to reach a broader customer base. For example, if a communications session is currently active between two devices, each of which receive service from independent service providers, the re-connection services may be extended, such that the service provider cooperatively determine the cause of the disconnect for the communications session and, based upon which device represents the calling party, the corresponding service provider may perform the functions described in the flow diagram of FIG. 2.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, or loaded into and/or executed by a computer, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing communications re-connection services, comprising:
   detecting a communications session between at least two devices, one of the at least two devices is a calling device that establishes the communication session by calling another of the at least two devices;
   determining whether a disconnection for the communications session occurring between the at least two devices is voluntary; and
   automatically attempting to re-establish the communications session between the at least two devices if results of the determining indicate that the disconnection was involuntary, an involuntary disconnection resulting from at least one of:
     a signal interruption;
     a device malfunction; and
     an out of area signal;
   wherein the calling device and the other of the at least two devices receive communications services from competing service provider enterprises and the service provider enterprise representing the calling device performs the automatic attempt to re-establish the communications session, the method farther comprising:
   repeating the attempting to re-establish the communications session if previous attempts are unsuccessful, the repeating performed by at least one of the competing service provider enterprises, and wherein repeating the attempts to re-establish the communications session continues until a time-out value has been reached, the time-out value including at least one of:
   a maximum number of attempts to re-connect; and
   a maximum period of time in attempting to re-connect.

2. The method of claim 1, further comprising:
   monitoring the communications session for a signal, the disconnection of a communications session being determined as a result of the monitoring.

3. The method of claim 2, wherein a voluntary disconnection of a communications session is determined upon detecting an on-hook signal from at least one of the two devices.

4. The method of claim 1, wherein re-establishing the communications session is performed upon detecting a presence of at least one of the two devices on a network, the presence detected via at least one of:
   an off-hook signal transmitted from the at least one of the two devices; and
   data packets received from the at least one of the two devices.

5. The method of claim 1, wherein the devices include at least one of:
   a wireline telephone configured for use over a circuit-switched network;
   a wireline telephone configured for use over a packet-switched network;
   a wireless telephone;
   a personal digital assistant;
   a wireline computer device; and
   a wireless computer device.

6. A system for implementing communications re-connection services, comprising:
   a host system;
   a communications re-connection application executing on the host system, performing:
   detecting a communications session between at least two devices, one of the at least two devices is a calling device that establishes the communication session by calling another of the at least two devices, wherein the calling device and the other of the at least two devices receive communications services from competing service provider enterprises;
   determining whether a disconnection for the communications session occurring between the at least two devices is voluntary;
   automatically attempting to re-establish the communications session between the at least two devices if results of the determining indicate that the disconnection was involuntary, and determining which of the competing service provider enterprises represents the calling device, wherein the service provider enterprise determined to represent the calling device performs the automatic attempt to re-establish the communication session; and
   repeating the attempting to re-establish the communications session if previous attempts are unsuccessful, the repeating performed by the service provider enterprise representing the calling device, and wherein repeating the attempts to re-establish the communications session continues until a time-out value has been reached, the time-out value including at least one of:
   a maximum number of attempts to re-connect; and
   a maximum period of time in attempting to re-connect.

7. The system of claim 6, wherein an involuntary disconnection results from at least one of:
   a signal interruption:
   a device malfunction; and
   an out of area signal;
   wherein the communications re-connection application further performs:
   monitoring the communications session for a signal, the disconnection of a communications session being determined as a result of the monitoring.

8. The system of claim 6, wherein a voluntary disconnection of a communications session is determined upon detecting an on-hook signal from at least one of the two devices.

9. The system of claim 6, wherein the devices include at least one of:
   a wireline telephone configured for use over a circuit-switched network;
   a wireline telephone configured for use over a packet-switched network;
   a wireless telephone;
   a personal digital assistant;
   a wireline computer device; and
   a wireless computer device.

10. A computer program product for implementing communications re-connection services, the computer program product comprising a storage medium storing instructions, which when executed by a computer-implement a method, the method comprising:
    detecting a communications session between at least two devices, one of the at least two devices is a calling device that establishes the communication session by calling another of the at least two devices;
    determining whether a disconnection for the communications session occurring between the at least two devices is voluntary; and
    automatically attempting to re-establish the communications session between the at least two devices if results of the determining indicate that the disconnection was involuntary, an involuntary disconnection resulting from at least one of:
      a signal interruption;
      a device malfunction; and
      an out of area signal;

wherein the calling device and the other of the at least two devices receive communications services from competing service provider enterprises and the service provider enterprise representing the calling device performs the automatic attempt to re-establish the communications session; the method further comprising:

repeating the attempt to re-establish the communications session if previous attempts are unsuccessful, the repeating performed by the service provider enterprise representing the calling device, and wherein repeating the attempt to re-establish the communications session continues until a time-out value has been reached, the time-out value including at least one of:

a maximum number of attempts to re-connect; and a maximum period of time in attempting to re-connect.

11. The computer program product of claim 10, further comprising instructions for performing:

monitoring the communications session for a signal, the disconnection of a communications session being determined as a result of the monitoring.

12. The computer program product of claim 11, wherein a voluntary disconnection of a communications session is determined upon detecting an on-hook signal from at least one of the two devices.

13. The computer program product of claim 10, wherein re-establishing the communications session is performed upon detecting a presence of at least one of the two devices on a network, the presence detected via at least one of:

an off-hook signal transmitted from the at least one of the two devices; and data packets received from the at least one of the two devices.

14. The computer program product of claim 10, wherein the devices include at least one of:

a wireline telephone configured for use over a circuit-switched network;

a wireline telephone configured for use over a packet-switched network;

a wireless telephone;

a personal digital assistant;

a wireline computer device; and a wireless computer device.

\* \* \* \* \*